Nov. 8, 1938.　　G. R. GAGNÉ ET AL　　2,136,188
VALVE REFACING DEVICE
Filed May 4, 1936　　5 Sheets-Sheet 4

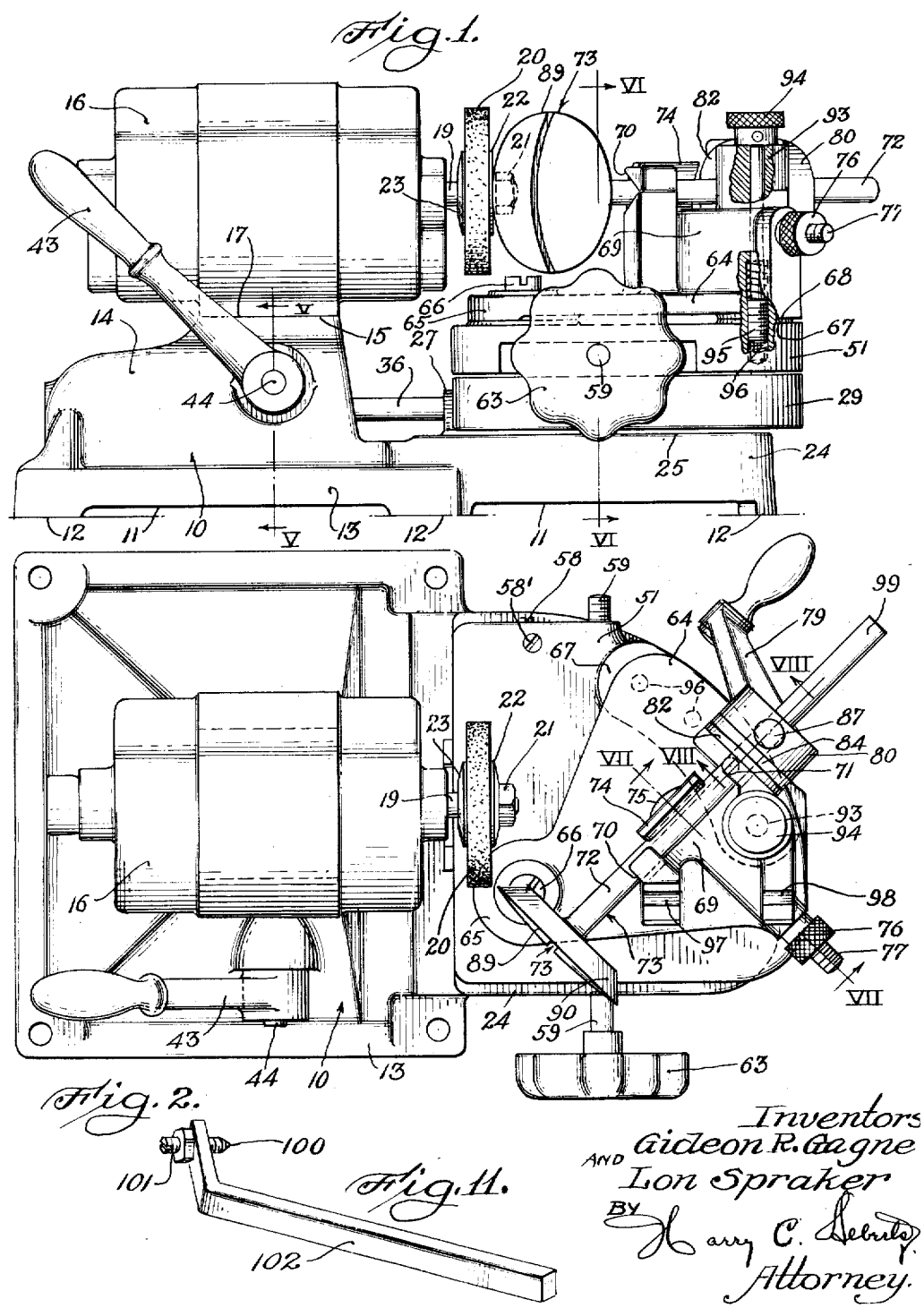

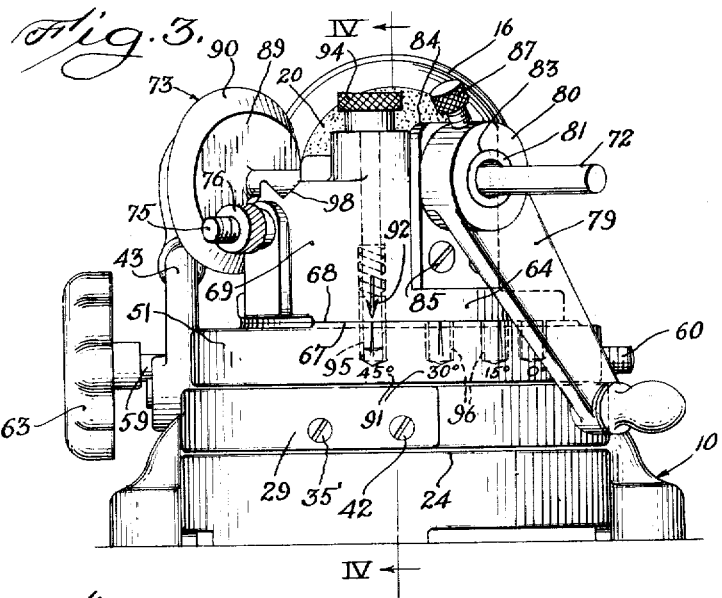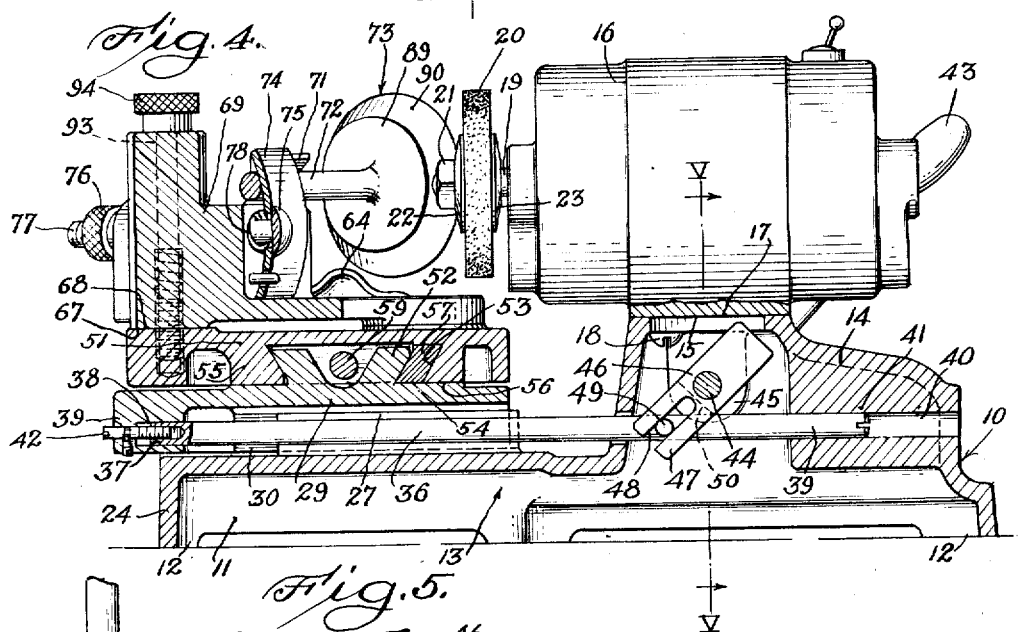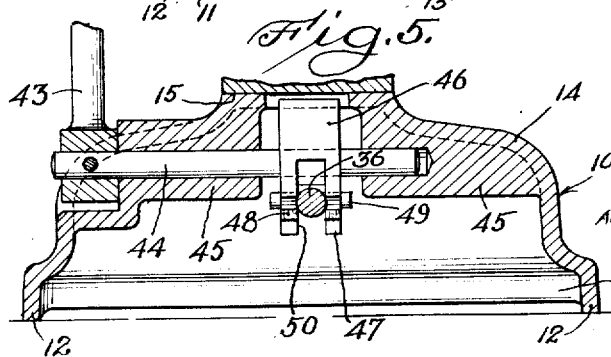

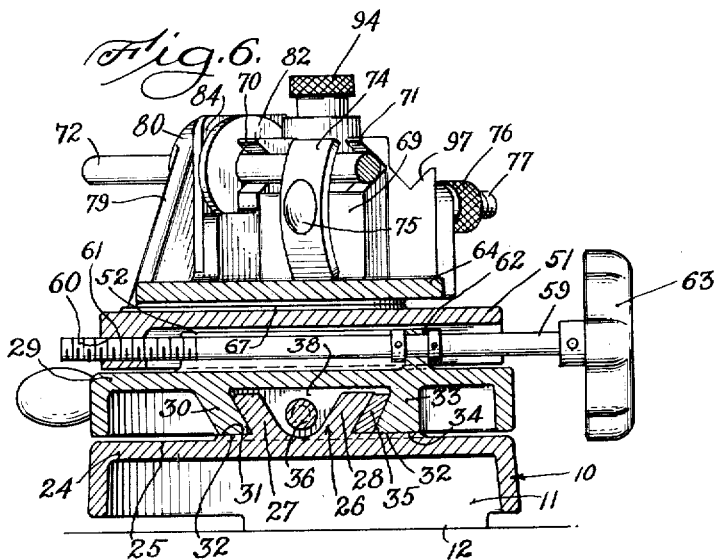

Inventors
Gideon R. Gagne and Lon Spraker
BY
Harry C. ḻeuty
Attorney.

Nov. 8, 1938.  G. R. GAGNÉ ET AL  2,136,188
VALVE REFACING DEVICE
Filed May 4, 1936  5 Sheets-Sheet 5
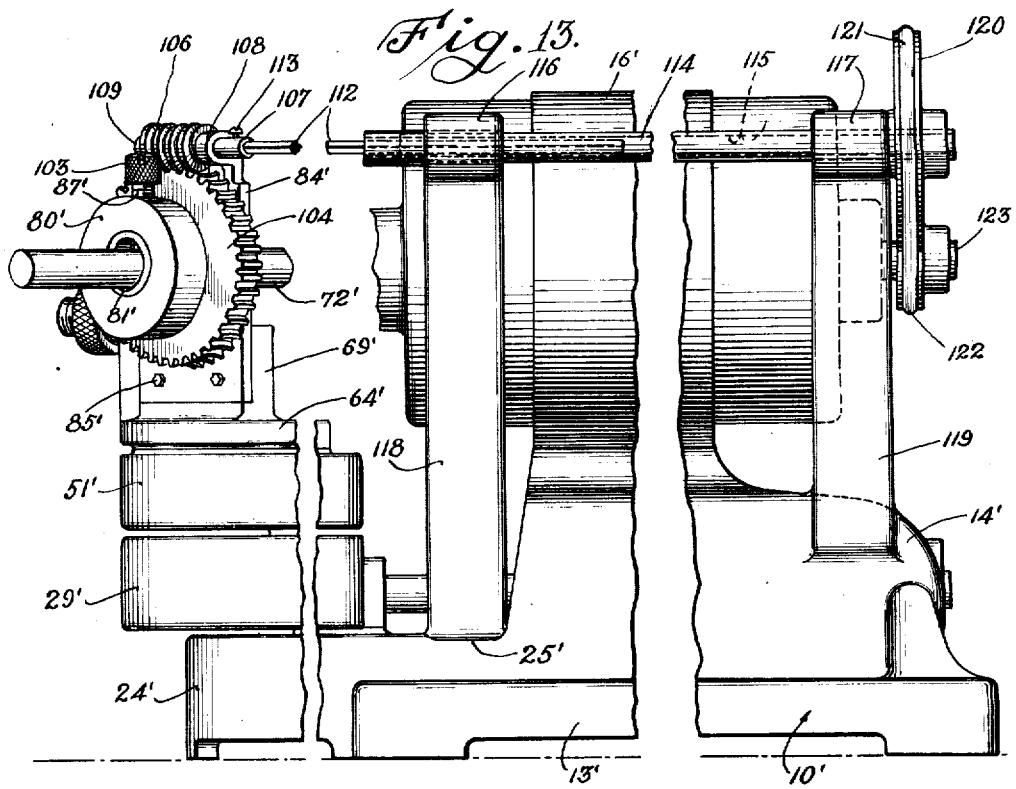
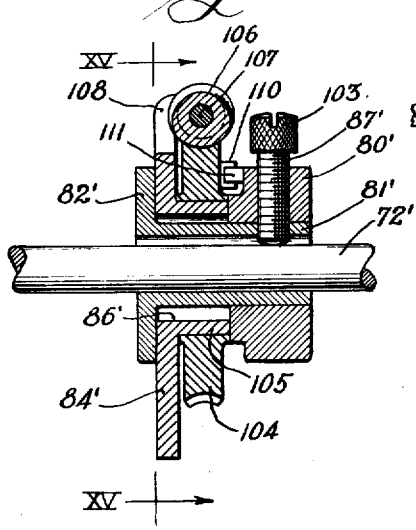
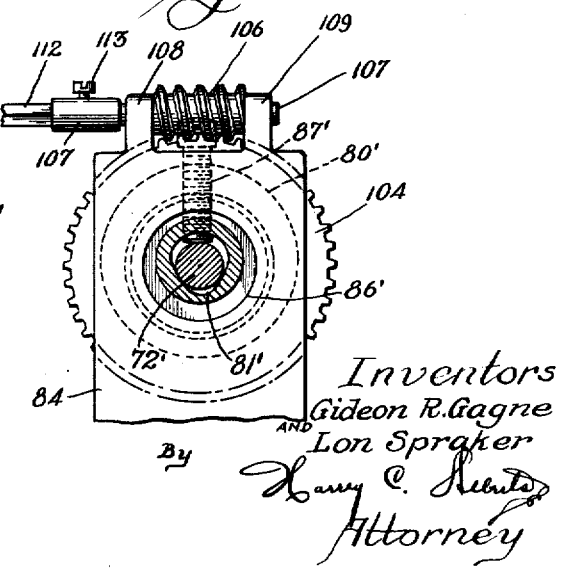

Patented Nov. 8, 1938

2,136,188

UNITED STATES PATENT OFFICE 2,136,188

VALVE REFACING DEVICE

Gideon R. Gagné, Kenosha, Wis., and Lon Spraker, Indianapolis, Ind., assignors to Snap-On Tools, Inc., Kenosha, Wis., a corporation of Delaware Application May 4, 1936, Serial No. 77,772

6 Claims. (Cl. 51—95)

This invention relates to valve refacing devices and more particularly to improvements in valve-seat resurfacing devices, although certain features thereof may be employed with equal advantage for other purposes It contemplates more especially the provision of a valve-seat resurfacing device that has a wide range of adjustment for different sizes and types of valves used primarily in internal combustion engines.

Numerous types of valve refacing devices have heretofore been proposed, but these have not proven entirely satisfactory in one manner or another nor do they embody an advantageous range of adjustment and flexibility that is highly desirable to render such effective for all valves of different sizes and types that are utilized in commercial practice. Then, too, a valve-seat resurfacing device should be instantaneously adjustable and accurate in its operation so as to produce uniform results without entailing much time, effort or any appreciable skill.

One object of the present invention is to simplify the construction and improve the operation of devices of the character mentioned.

Another object is to provide an improved valve-seat resurfacing device that is simple in construction and entails minimum time and skill in its adjustment and operation on valves of different sizes and types.

Still another object is to provide a valve refacing device that is compact, self-contained, and portable to enable the refacing of valves of different sizes and types with uniformity of result, accuracy and without entailing any appreciable skill or time.

A further object is to provide a novel valve clamping and rotating device in conjunction with a valve seat refacing wheel to render the operation thereof simple, accurate and devoid of any requirement for the application of any unusual skill.

A still further object is to provide a valve refacing device having a power actuated grinding wheel in conjunction with improved instrumentalities for clamping and manipulating valves to assume a variety of positions depending upon the type, size and desired valve-seat angle to be resurfaced thereon.

Still a further object is to provide improved clamping, rotating and angular adjustment means for valves in order to accomplish valve seat refacing with minimum skill, time and effort.

An additional object is to provide an improved valve resurfacing device that embodies power actuated grinding and valve turning expedients in combination with adjustment to accommodate valves of different sizes and valve seat inclinations.

Still an additional object is to provide power actuated valve rotating means in combination with a rotating grinding wheel so as to enable operative contact therebetween to effect improved valve resurfacing.

Other objects and advantages will appear from the following description of an illustrative embodiment of the present invention.

In the drawings:

Figure 1 is a front view in elevation of the device embodying features of the present invention.

Figure 2 is a plan view of the device shown in Figure 1.

Figure 3 is an end view of the device shown in Figures 1 and 2

Figure 4 is a sectional view in elevation taken substantially along line IV—IV of Figure 3.

Figure 5 is a fragmentary sectional view in elevation taken substantially along line V—V of Figure 1.

Figure 6 is a sectional view in elevation taken substantially along line VI—VI of Figure 1.

Figure 7 is a sectional view of a clamping device taken substantially along line VII—VII of Figure 2.

Figure 8 is a sectional view of the rotating member taken substantially along line VIII—VIII of Figure 2.

Figure 9 is a sectional view taken substantially along line IX—IX of Figure 8.

Figure 10 is a fragmentary plan view of the valve clamping mechanism showing the valve in a position for refacing the extremity of the valve stem.

Figure 11 is a perspective view of a grinding wheel dressing device which is designed for attachment in place of the valve to be resurfaced.

Figure 13 is a fragmentary side view in elevation of the device shown in Figure 12, parts thereof being broken away to clarify the showing.

Figure 14 is a sectional view taken substantially along line XIV—XIV of Figure 12.

Figure 15 is a sectional view taken substantially along line XV—XV of Figure 12.

Figure 12:
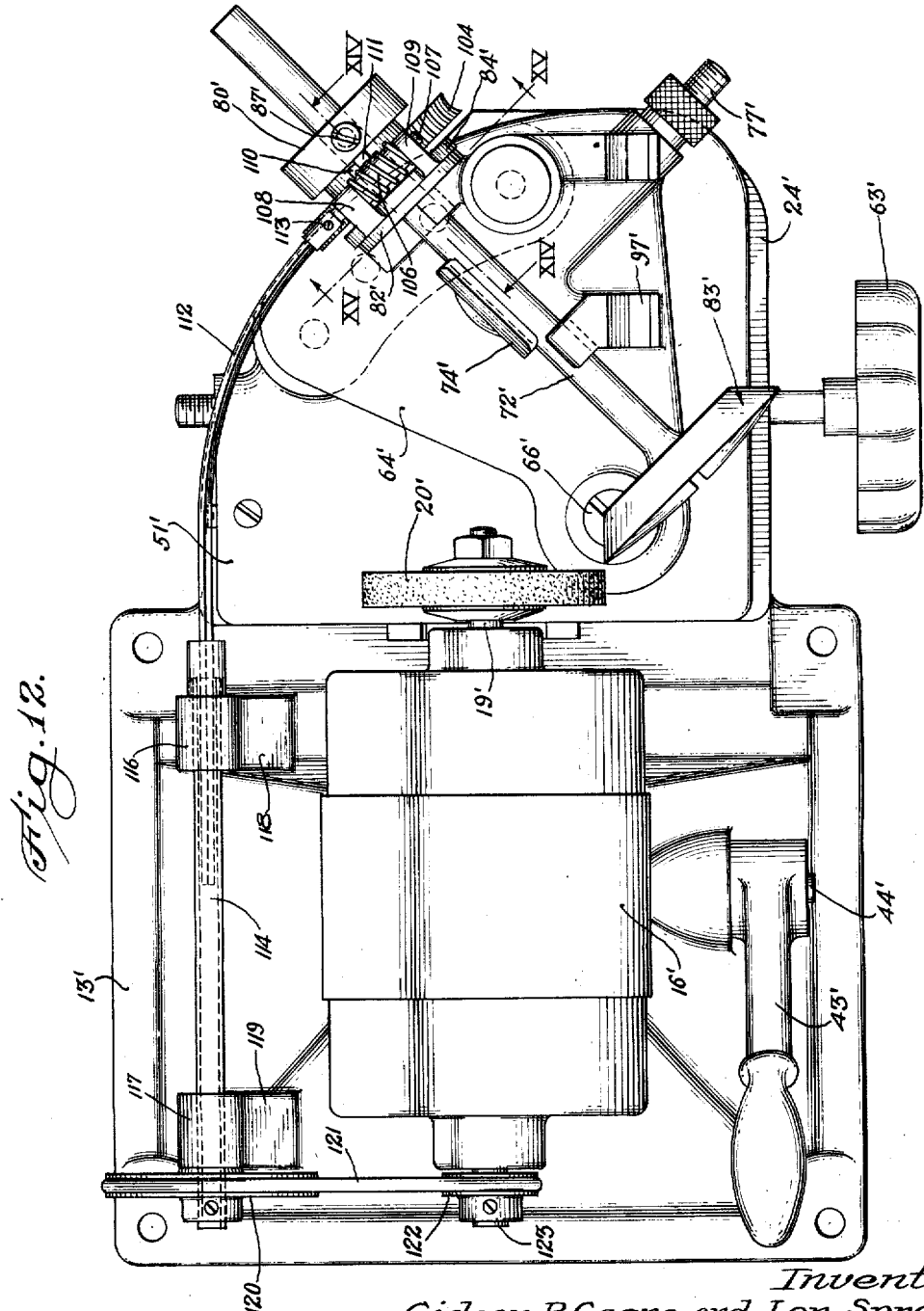
Figure 12 is a plan view of a modified embodiment of the present invention with novel means in combination therewith to rotate the valve as well as the grinding wheel.

The structure selected for illustration comprises a frame 10 molded or otherwise shaped to present a base 11 having a suitable number of depending lugs 12 to sustain the frame 10 upon a table or other surface wherever the device is to be utilized to the best advantage. As shown, the base 10 is shaped to provide a substantially rectangular portion 13 which has an upwardly diverging portion or boss 14 terminating in a flat horizontal plane surface 15 to serve as a mount and bracket for an electric motor 16. The electric motor 16 has, in this instance, a correspondingly shaped and sized plane surface 17 along the transverse median line thereof to conform in area and extent with the bracket surface 15 which comprises a part of the hollow boss 14 so as to receive fasteners such as screws 18 through the bottom thereof to engage the complemental surface 17 comprising a part of the electric motor housing 16.

The electric motor 16 has its armature shaft 19 extending along the longitudinal median line of the base 11 to support a circular grinding wheel 20 which is attached for rotation therewith by means of a threaded nut 21 and the customary discs 22 and 23 disposed on both sides of the grinding wheel 20. It will be observed that the grinding wheel 20 is mounted for rotation in a position above an extended portion 24 of the base 11 that is, in this instance, formed integrally with the rectangular portion 13 to provide a low platform to secure valve clamping and rotating instrumentalities as will appear more fully hereinafter. It is worthy of note that the low platform 24 has a flat top surface 25 to which is attached the desired valve supporting and clamping expedients to be presently described.

To this end, the flat supporting surface 25 presents diverging ridges 27 and 28 formed integral therewith along a longitudinal median line extending in the direction of the armature shaft 19 to reciprocally guide a carriage 29 as will appear more fully hereinafter. The inclined guide ridge 27 cooperates with a correspondingly inclined rib 30 depending from and formed integral with the carriage 29 so that its edge 31 will contact with a slightly up-raised portion 32 formed on the flat platform surface 25 to serve as a support therefor. Another rib 33 depends angularly downward from the carriage 29 so that its edge 34 contacts the upraised portion 32 for cooperation with a gib or wedge block 35 that rests between the inclined guide ridges 28 and the rib 33 formed as a part of the carriage 29. The gib 35 is attached to the carriage 29 by a screw 35' that enables its adjustment to compensate for wear from time to time. The carriage 29, in this instance, conforms in shape and size with the platform 24 of the base member 11, and is displaceable longitudinally relative to the motor shaft 19 for guided movement along the guide member 26 toward and from the grinding wheel 20.

This is accomplished in the present embodiment by means of a rod 36 which has one extremity 37 in telescopic engagement with a correspondingly sized bore 38 provided in a solid side wall 39 formed on the carriage 29. As shown, the rod 36 projects between the diverging ridges 27 and 28 of the substantially V-shaped guide member 26 for movement relative thereto while its other extremity 39 is telescopically received for reciprocal support in a bore 40 provided in a solid portion 41 comprising an integral part of the upstanding base member 14 beneath the exterior confines thereof. A threaded stud 42 is provided for threaded engagement with the extremity 37 of the rod 36 to enable exteriorly accessible screw-driver adjustment thereof relative to the wall 39 of the carriage 29, thereby varying the position of the latter relative to the rod 36.

Reciprocation of the carriage 29 is effected by means of a handle 43 which is attached to a transverse stub-shaft 44 journaled in bearings 45 comprising, in this instance, an integral part of the upstanding base portion 14. A lever 46 is fixed to shaft 44 beneath the upstanding boss portion 14 and between the bearings 45, it being provided with a furcated extremity 47 defining a slot 48 (Figure 4) that cooperates with a pin 49 anchored to the rod 36 so that reciprocation of the latter will be effected responsive to oscillating the handle 43 to displace the carriage 29 toward and from the electric motor 16. It is worthy of note that the lever 46 is also furcated to provide a notch 50 (Figure 5) to freely accommodate the rod 36 so as to offer no obstruction thereto.

Now, then, the carriage 29 has another carriage 51 superposed thereon to move with and in a direction transversely of the carriage 29. To this end, an upstanding transversely extending substantially V-shaped guide member 52 is provided on the carriage 29 and, in this instance, is formed integral therewith. The guide member 52 has one of its inclined ridges cooperating with an inclined rib 53 depending from the top surface of the carriage 51 to coact with the inclined confronting side of the guide member 52. The edge of the rib 53 serves as a support therefor in contact with an up-raised ridge 54 formed on the top surface of the carriage 29. Then, too, an inclined depending rib 55 is formed integrally with the carriage 51 to contact with an up-raised ridge 56 formed on the top surface of the carriage 29 to serve as a slidable support for the carriage 51. A gib or wedge block 57 is interposed between the inclined rib 53 and the other inclined side of the guide member 52 to effect transverse reciprocal guidance of the carriage 51 and to enable compensation for wear which is rendered possible by adjusting the exteriorly accessible threaded stud 58 (Figure 2) that extends through the end wall of the carriage 51 to engage the gib or wedge block 57 and render such movable relative thereto. Another stud 58 projects through the top surface of the carriage 51 to serve as a lock for the adjustable gib 57 to preclude accidental movement of the screw 58 or gib 57.

A displacing mechanism for the carriage 51 comprises, in this instance, a rod 59 that has an extremity 60 in threaded engagement with a wall 61 of the carriage 51 for relative adjustment therewith. The rod 59 is journaled in an upstanding bracket 62 comprising a part of the carriage 29 and a hand knob 63 is attached to the extremity thereof to enable its manipulation and effect the transverse displacement of the carriage 51 with the instrumentalities for resurfacing valves mounted thereon as will appear more fully hereinafter. An instrumental mounting plate comprising a quadrant or sector 64 is pivoted at the apex 65 thereof by means of a threaded stud 66 which is mounted in a carriage 51 at a point proximate to the grinding wheel 20. An arcuate ridge 67 is formed on the surface of the carriage 51 to cooperate with a depending ridge 68 formed on the quadrant 64 to contact therewith and maintain the latter in a rotary adjustable position relative to its pivot 66.

In the present embodiment, the quadrant 64 is provided with an upstanding or raised boss 69 that has substantially V-shaped lugs or guide groove 70 and 71 milled or otherwise cut therein to present a support for an elongated member such as stem 72 of a valve 73 of any standard or approved construction. The substantially V-shaped lugs 70 and 71 open or extend laterally to receive the stem 72 of the valve 73 so that its axis is in a direction normally inclined to the flat surface of the grinding wheel 20. In the present embodiment, the normal angularity is 45° when the quadrant 64 is in its initial or normal position. The valve stem 72 is maintained in the V-shaped lugs 70 and 71 by means of an arcuate plate clamp 74 which is of substantially rectangular configuration and is provided with an aperture therethrough to receive a bolt 75. The bolt 75 extends perpendicularly through the quadrant boss 69 in a direction normal to the valve stem 73 to hold the latter in the V-shaped lugs 70 and 71 responsive to a nut 76 that is in threaded engagement with the extremity 77 of the bolt 75, thereby holding the valve stem 72 in notches of the lugs 70 and 71 for resilient contact therewith owing to the urge of the spring 78 that envelops the bolt 75 between the boss 69 and the plate 74.

The resilient clamping of the valve stem 73 enables its rotation responsive to a crank handle 79 that terminates in an enlarged circular extremity 80 for receiving the reduced shank 81 of a bearing 82 therethrough. The reduced bearing shank 81 is in telescopic association with a correspondingly sized bore 83 provided in the extremity 80 of the handle member 79. Now, then, an upstanding plate 84 is attached to the boss 69 of the quadrant 64 by means of fasteners 85, it having an enlarged aperture or bore 86 extending therethrough to receive the substantially smaller shank 81 of the bearing 82 to enable radial displacement of the latter together with its handle member 79 relative to the plate 84. A set-screw 87 extends radially through the wall of the handle extremity 80 and the shank 81 of the bearing 82 to retain these parts in assembled relation with the plate 84 disposed therebetween as well as to engage the stem 72 of the valve 73 to effect the rotation thereof responsive to the manipulation of the crank handle 79. It will be observed that the bore 88 of the bearing 81 is substantially larger than the ordinary stem 72 of valves 73 to accommodate the largest sizes thereof and the difference in size between the aperture 86 and the plate 84 as compared to the external diameter of the bearing shank 81, allows for a valve stem 72 of varying size being held centrally by the V-shaped brackets 70 and 71 responsive to the clamping of the plate 74 which is drawn tight by the nut 76 that engages the threaded bolt extremity 77.

It will be apparent that the clamping of the valve stem 72 in the V-shaped blocks 70 aand 71 places the valve head 89 in the desired position so that its peripheral valve seat 90 will be parallel to the peripheral edge of the grinding wheel 20. This would be the case where the angularity of the valve seat 90 is 45°, but in valves having valve seats 90 of other angularities, adjustment in the angular clamping position of the stem 72 is effected by adjusting the position of the quadrant 64 by manipulating the pivot screw 66. Consequently, the valve seat edge 90 may be placed in parallel confronting alignment with the peripheral edge of the grinding wheel 20 irrespective of its angularity, there being calibrations 91 on the peripheral wall of the carriage 51 to co-operate with an indicator 92 on the adjacent edge of the quadrant 64 to determine and indicate the angularity of the latter with respect to the carriage 51.

Consequently, with the valve 73 properly clamped, it may be rotated responsive to turning the handle crank 79 while the handle member 43 is manipulated to bring the valve seat 90 in contacting alignment with the peripheral edge of the grinding wheel 20. Accurate re-surfacing of the peripheral valve seat 90 is capable of accomplishment with minimum effort, without entailing much time, or requiring any special skill. If the peripheral valve seat 90 is wider than the peripheral edge of the grinding wheel 20, the handle member 43 may be oscillated to and fro for insuring uniform grinding contact at every portion of the peripheral valve seat 90 while it is being rotated responsive to the handle member 79.

It is to be noted that the quadrant 64 is held in adjusted angular position by a stud 93 having a knurled head 94. The stud 93 is resiliently mounted in the valve support bracket 69 to normally urge its threaded extremity 95 downwardly in correspondingly threaded cavities 96 that are provided in the arcuate ridge 67 to correspond with the graduated positions 91 and to serve as indexing means therefor. With the cooperation of the quadrant pivot 66, the stud 93 holds the quadrant 64 in adjusted position. Another pair of V-shaped brackets or slots 97 and 98 are provided in the upstanding boss 69 along the top edge thereof in linear alignment for maintaining the valve stem 72 in a position normal to the surface of the grinding wheel 20 (see Figure 10). This enables resurfacing at the extremity 99 of the valve stem 72 against the flat surface of the grinding wheel 20. To dress the grinding wheel 20, a diamond stud 100 in the mount 101 is clamped in position by its hexagonal shank 102 being substituted for the valve stem 72, and the handle 43 is then oscillated to provide a new peripheral edge on the grinding wheel 20.

In the modified embodiment shown in Figures 12 to 15 inclusive, the manual valve rotating member or handle 79 with its circular bearing 80 is dispensed with, and a collar 80' substituted therefor to envelop a bearing shank 81' for connection thereto by means of a threaded stud 87' preferably having a screw driver engaging slot 103 provided in the extremity thereof. This affords the rotation of the collar 80' with the bearing 82' through the medium of the shank 81' owing to the rotation of a worm-wheel 104 that is journalled to idle on a tubular shank 105 of the bearing shank 81' that extends laterally from the plate 84'. The plate 84' is attached to the upstanding boss 69' of the quadrant 64' by means of fasteners 85'. The tubular bearing 105 has an enlarged bore 86' extending therethrough to receive the substantially smaller shank 81' of the bearing 82' and to enable radial displacement of the latter together with its collar 80' relative to the plate 84'. The set screw 87' extends radially through the wall of the collar 80' of the bearing shank 81' to retain these parts in assembled relation with the plate 84' disposed therebetween as well as to engage the stem 72' of the valve 83' to effect the rotation thereof responsive to a power driven worm 106 that is in meshing engagement with the worm-wheel 104.

The worm 106 is carried by a shaft 107 journalled in spaced bearings 108 and 109. The bearings 108 and 109 are, in this instance, formed integral with the plate 84' to sustain the worm 106 in fixed meshing relation with the worm-wheel 104 that rotates relative to the tubular shank 105 serving as its bearing. The worm-wheel 104 is retained in assembled association over the tubular shank 105 and between the plate 84' of the collar 80' owing to the connection of the latter with the bearing shank 81' and with the stud 87'. It is to be observed that rotation of the valve stem 72' is effected responsive to the rotation of the worm-wheel 104 that has a laterally projecting lug 110 disposed in the path of a confronting lug 111 extending from and formed integral with the collar 80'.

Consequently rotation of the worm-wheel 104 in a clockwise direction (viewed from Figures 13 and 15) will cause corresponding rotation of the collar 80' and the valve stem 72' that is engaged by the stud 87' which is detachably connected therewith by its manipulation with a screw driver or other common tool designed for that purpose. Rotation of the worm 106 is effected, in this instance, by means of a flexible shaft 112 which is preferably of hexagonal cross-section for driving connection with a correspondingly shaped tubular extremity of the worm shaft 107. Connection between the worm shaft 107 and the flexible shaft 112 is effected by means of a threaded stud 113. The flexible shaft 112 is telescopically received within a tubular shaft 114 which has a correspondingly shaped rectangular bore 115 to rotatively engage the flexible shaft 112 while permitting its longitudinal displacement therein so that the quadrant 64' may be rotated relative to its pivot 66' and still maintain the driving connection between the worm 106 and the driving tubular shaft 114.

The driving tubular shaft 114 is journalled in bearings 116 and 117 that are formed integral with brackets 118 and 119, respectively, for attachment to the frame 10' and more particularly, in this instance, to its upstanding boss 14' and the adjacent platform 25' that are described in detail with reference to the embodiments of the invention shown in Figures 1 to 11 inclusive. The tubular shaft 114 projects beyond the bearing 117 to carry a pulley 120 attached thereto for rotation therewith. The pulley 120 has a peripheral groove for guiding a belt 121 thereover in peripheral engagement with a comparatively smaller pulley 122 carried by a rearward projecting extremity 123 of the motor armature shaft 19'. The pulley 122 is much smaller in diameter than the comparatively larger pulley 120 so as to substantially reduce the speed of rotation of the tubular shaft 114 that imparts corresponding rotation to the flexible shaft 112 to rotate the worm 106 which is in meshing engagement with the comparatively larger worm-wheel 104 to rotate the valve stem 72' at substantially lesser speeds than the normal speed of rotation of the motor 16'.

The other features and parts of the preferred modified embodiment shown in Figures 12 to 15 inclusive are identical with the structural features described in connection with the embodiment disclosed in Figures 1 to 11 inclusive that have been described in detail. Consequently the description will suffice for the modified embodiment as the remaining parts that have not been specifically referred to in connection with the power actuated valve embodiment disclosed in Figures 12 to 15 as distinguished from the hand valve embodiment disclosed in Figures 1 to 11 inclusive.

With the arrangement of parts above described in connection with Figures 1 to 11 inclusive, the transverse position of the carriage 51 is adjustable by manipulating the hand knob 63 so as to bring the valve seat 90 in contact with the periphery of the grinding wheel 20 while its stem 72 is clamped in position as described supra. The carriage 29 is reciprocable with the carriage 51 in the direction of the armature shaft 19 of the motor 16, this being responsive to the manipulation of the handle member 43. The angular position of the valve stem 72 is adjustable by pivotally displacing the quadrant 64 about its pivot 66 after the indexing and securing stud 93 has been disengaged from its cooperating cavity 95, and rotation of the valve stem 72 with its head 89 is effected by rotating the handle crank 79. Thus a very simple, compact and exceedingly flexible valve refacing device has been provided which is accurate, entails little time, and results in the uniform resurfacing of valves without any special skill.

The power actuated valve embodiment shown in Figures 12 to 15 inclusive operates substantially the same except that the handle crank 79 is substituted by the collar 80' and its associated parts comprising the worm-wheel 104, the worm 106, the flexible shaft 112, the tubular shaft 114 and the pulleys 120-122 that render all of these instrumentalities responsive to the motor 16'. Consequently, uniform power rotation is imparted to the valve stem 72' while the grinding wheel 20' is directly rotated at a substantially higher speed by the motor 16'.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:—

1. In a portable valve refacing device, the combination with a frame, of an electric motor mounted on said frame, a grinding wheel carried by said motor for rotation therewith, a valve support movably mounted on said frame, for adjustably sustaining a valve with its seat against said grinding wheel, means for displacing said valve support longitudinally of the grinding wheel axis, means for displacing said valve support transversely of the grinding wheel axis, means for enabling the angular displacement of said valve support relative to said grinding wheel, means for indexing and maintaining the angular position of said valve support, and means for rotating said valve.

2. In a portable valve refacing device, the combination with a frame, of an electric motor mounted on said frame, a grinding wheel carried by said motor for rotation therewith, a valve support movably mounted on said frame, for adjustably sustaining a valve with its seat against said grinding wheel, means for enabling the angular displacement of said valve support relative to said grinding wheel, means for indexing and maintaining the angular position of said valve support, and means for rotating said valve.

3. In a portable valve refacing device, the combination with a frame, of an electric motor mounted on said frame, a grinding wheel carried by said motor for rotation therewith, a valve support movably mounted on said frame, for adjustably sustaining a valve with its seat against said grinding wheel, means for displacing said valve support longitudinally of the grinding wheel axis, means for enabling the angular displacement of said valve support relative to said grinding wheel, means for indexing and maintaining the angular position of said valve support, and means for rotating said valve.

4. In a portable valve refacing device, the combination with a frame, of a grinding wheel rotatively mounted on said frame, a support on said frame for sustaining a valve relative to said grinding wheel, clamping means for rotatively securing the valve to said support, a crank mechanism rotatively associated with said support for attachment to the stem of a valve mounted in said support, said crank mechanism having an axial bore of greater diameter than the largest size valve stem to be rotated therewith, and means on said crank mechanism to engage a valve stem to effect the rotation thereof.

5. In a portable valve refacing device, the combination with a frame, of an electric motor mounted on said frame, a grinding wheel carried by said motor for rotation therewith, a valve support mounted on said frame for sustaining a valve with its seat against said grinding wheel, radially adjustable means for rotating said valve, said radially cranking means journalled in said support, said cranking means having an axial bore of greater diameter than the largest size valve stem to be rotated therewith, and means in said crank mechanism to engage a valve stem.

6. In a portable valve refacing device, the combination with a frame, of an electric motor mounted on said frame, a grinding wheel carried by said motor for rotation therewith, a valve support movably mounted on said frame, for adjustably sustaining a valve with its seat against said grinding wheel, means for displacing said valve support longitudinally of the grinding wheel axis, means for displacing said valve support transversely of the grind-wheel axis, radially adjustable cranking means for rotating said valve, said crank mechanism having an axial bore of greater diameter than the largest size valve stem to be rotated therewith, and means on said crank mechanism to engage a valve stem.

GIDEON R. GAGNÉ.
LON SPRAKER.